United States Patent [19]

Etchu et al.

[11] Patent Number: 5,415,930
[45] Date of Patent: May 16, 1995

[54] BIAXIALLY ORIENTED, UNIDIRECTIONALLY LONG POLYETHYLENE-2,6-NAPHTHALATE FILM AND MAGNETIC TAPE THEREFROM

[75] Inventors: Masami Etchu, Yokohama; Hisashi Hamano, Sagamihara; Masahiro Hosoi, Tokyo; Yasuhiro Saeki, Sagamihara, all of Japan

[73] Assignee: Teijin Limited, Osaka, Japan

[21] Appl. No.: 181,377

[22] Filed: Jan. 14, 1994

Related U.S. Application Data

[63] Continuation of Ser. No. 928,294, Aug. 12, 1992, abandoned.

[30] Foreign Application Priority Data

Aug. 13, 1991 [JP] Japan .................. 3-226416

[51] Int. Cl.$^6$ .......... B32B 5/16; B32B 27/36
[52] U.S. Cl. .............. 428/323; 428/409; 428/480; 428/694 R; 428/694 B; 428/900; 360/134; 524/425; 524/493
[58] Field of Search ............. 524/493, 425; 428/409, 428/480, 694 R, 900, 323, 694 B; 360/134

[56] References Cited

U.S. PATENT DOCUMENTS

| | | | |
|---|---|---|---|
| 4,804,736 | 2/1989 | Utsumi | 428/480 |
| 4,990,400 | 2/1991 | Endo et al. | 428/480 |
| 5,106,681 | 4/1992 | Endo et al. | 428/480 |

FOREIGN PATENT DOCUMENTS 0124291 11/1984 European Pat. Off. .
0257611 3/1988 European Pat. Off. .
0460640 12/1991 European Pat. Off. .

OTHER PUBLICATIONS

Database WPIL Week 8638-Abstract of Japanese Laid-Open Patent Publication No. 61-179 721.
Database WPIL Week 9040-Abstract of Japanese Laid-Open Patent Publication No. 2-214 736.

*Primary Examiner*—Tae H. Yoon
*Attorney, Agent, or Firm*—Sherman & Shalloway

[57] ABSTRACT

A biaxially oriented, unidirectionally long polyethylene-2,6-naphthalate film, (A) which contains
  (a) 0.05 to 0.4% by weight of first inert solid particles having an average particle diameter of 0.05 to 0.3 μm, and
  (b) 0.005 to 0.05% by weight of second inert solid particles having an average particle diameter of 0.3 to 1.0 μm, this average particle diameter being greater than the average particle diameter of the first inert solid particles by at least 0.2 μm, wherein:

(B) the Young's modulus in the length direction is at least 650 kg/mm$^2$, the Young's modulus in the width direction is at least 600 kg/mm$^2$, the Young's modulus in the length direction is greater than the Young's modulus in the width direction, (C) the heat shrinkage factor in the length direction in heat treatment at 70° C. for 1 hour under no load is not more than 0.08%, and (D) the surface roughness, Ra, is 3 to 10 nm; and a magnetic tape obtained therefrom.

5 Claims, No Drawings

BIAXIALLY ORIENTED, UNIDIRECTIONALLY LONG POLYETHYLENE-2,6-NAPHTHALATE FILM AND MAGNETIC TAPE THEREFROM

This application is a continuation of application Ser. No. 07/928,294, filed Aug. 12, 1992, now abandoned.

DETAILED DESCRIPTION OF THE INVENTION

The present invention relates to a biaxially oriented, unidirectionally long polyethylene 2,6-naphthalate film and a magnetic tape produced therefrom. More specifically, it relates to a biaxially oriented, unidirectionally long polyethylene-2,6-naphthalate film useful as a base film for a high-density recording magnetic recording medium, particularly for a metal tape, and also to a magnetic tape produced by using the same.

A polyethylene terephthalate film is widely used as a base film for magnetic tapes. In recent years, magnetic tapes are being increasingly required to enable high-density recording for downsizing of their own and for achieving high-quality images. Further, it is also required to decrease the thickness of magnetic tapes, as is typically required of 8-mm video tapes. For these reasons, the magnetic layer-side surface of a magnetic tape is required to be smoothest possible, and the thickness of a magnetic tape is required to be smallest possible. Due to this, a base film is also required to be flatter on the surface and smaller in the thickness. However, a polyester film used as a base film of conventional home VTR magnetic tapes has a rough surface, and no films have satisfied the above requirements for practical use. For high-density recording, it is required to extremely decrease the surface roughness. However, when the surface roughness is decreased, the lubricity between film surfaces deteriorates. Further, air entrapped between film surfaces is hardly or poorly released, which makes it very difficult to take up the film on a roll. This difficulty increases as the film thickness decreases. Moreover, as the film thickness decrease, the film is required to have a higher Young's modulus. On the other hand, generally, the higher the Young's modulus is the larger the shrinkage factor of a film is and the dimensional stability of a magnetic tape formed from such film deteriorates. Furthermore, the so-obtained magnetic tape shows an extreme surface roughness printing phenomenon (in which a finished magnetic surface is toughened since the finished magnetic surface and a base film surface are tightly contacted to each other in the heat treatment step for thermosetting the magnetic tape by heating a roll of the magnetic tape), and the electromagnetic characteristics are deteriorated. Therefore, no conventional polyester films have satisfied the requirements for the above-described high-density recording tape.

It is an object of the present invention to provide a biaxially oriented, unidirectionally long polyethylene-2,6-naphthalate film.

It is another object of the present invention to provide a biaxially oriented, unidirectionally long polyethylene-2,6-naphthalate film, in which the Young's modulus in the length direction is greater than the Young's modulus in the width direction.

It is further another object of the present invention to provide a biaxially oriented, unidirectionally long polyethylene-2,6-naphthalate film, which gives a high-density magnetic recording tape excellent in electromagnetic characteristics and capable of being easily taken up in a roll form.

Other objects and advantages of the present invention will be apparent from the following description.

According to the present invention, the above objects and advantages of the present invention are achieved, first, by a biaxially oriented, unidirectionally long polyethylene-2,6-naphthalate film, (A) which contains
  (a) 0.05 to 0.4% by weight of first inert solid particles having an average particle diameter of 0.05 to 0.3 $\mu$m, and
  (b) 0.005 to 0.05% by weight of second inert solid particles having an average particle diameter of 0.3 to 1.0 $\mu$m, this average particle diameter being greater than the average particle diameter of the first inert solid particles by at least 0.2 $\mu$m, wherein:

(B) the Young's modulus in the length direction is at least 650 kg/mm$^2$ the Young's modulus in the width direction is at least 600 kg/mm$^2$ the Young's modulus in the length direction is greater than the Young's modulus in the width direction, (C) the heat shrinkage factor in the length direction in heat treatment at 70° C. for 1 hour under no load is not more than 0.08%, and (D) the surface roughness, Ra, is 3 to 10 nm.

In the present specification, the term "unidirectionally long" is used in the meaning that a length in the length direction is greater than that in the width direction.

In the present invention, the polyethylene-2,6-naphthalate constituting the film is a polymer having naphthalenedicarboxylic acid as a main acid component and ethylene glycol as a main glycol component. In addition to these main components, a small amount of other dicarboxylic acid component and a small amount of other glycol component may be incorporated.

The above "other dicarboxylic acid component" includes aromatic dicarboxylic acids such as terephthalic acid, isophthalic acid, diphenylsulphone-dicarboxylic acid and benzophenonedicarboxylic acid; aliphatic dicarboxylic acids such as succinic acid, adipic acid, sebacic acid and dodecanedicarboxylic acid; and alicyclic dicarboxylic acids such as hexahydroterephthalic acid and 1,3-adamantanedicarboxylic acid.

The above "other glycol component" includes 1,3-propanediol, 1,4-butanediol, 1,6-hexanediol, neopentyl glycol, 1,4-cyclohexanedimethanol and p-xylylene glycol. The above polymer may also contain additives such as a stabilizer and a colorant.

The polyethylene-2,6-naphthalate can be generally prepared by such a known method as a melt-polymerization method, and in this preparation, additives such as catalyst may be optionally used as required.

The polyethylene-2,6-naphthalate preferably has an intrinsic viscosity in the range of 0.45 to 0.90.

The biaxially oriented, unidirectionally long film of the present invention contains first inert solid particles and second inert solid particles.

The first inert solid particles have an average particle diameter of 0.05 to 0.3 $\mu$m, preferably 0.1 to 0.3 $\mu$m. The first inert solid particles are contained in an amount of 0.05 to 0.4% by weight, preferably 0.1 to 0.3% by weight.

The second inert solid particles have an average particle diameter of 0.3 to 1.0 $\mu$m, preferably 0.5 to 0.8 $\mu$m. The second inert solid particles are contained in all amount of 0.005 to 0.05% by weight, preferably 0.01 to 0.03% by weight. Further, the average particle diameter of the second inert solid particles is greater than the average particle diameter of the first inert solid particles by at least 0.2 μm, preferably by at least 0.3 μm.

It is preferred not to incorporate a large amount of the second inert solid particles in view of the electromagnetic characteristics of the film. However, it is difficult to take up the film if the film contains no second inert solid particles. It is therefore preferred to improve the "take-up" properties by incorporating a small amount of the second inert solid particles. When the amount of the second inert solid particles exceeds 0.05% by weight, the electromagnetic characteristics undesirably deteriorate. On the other hand, when the amount of the first inert solid particles is less than 0.05% by weight, it is difficult to take up the film even if the second inert solid particles are incorporated. When the amount of the first inert solid particles exceeds 0.4% by weight, the first inert solid particles undesirably affect the electromagnetic characteristics. Further, when the difference between the average particle diameter of the first inert solid particles and that of the second inert solid particles is smaller than 0.2 μm, there is obtained no film which satisfies both the take-up properties and the electromagnetic characteristics.

The material for the first and second inert solid particles preferably includes (1) silicon dioxide (including hydrate, diatomaccous earth, silica sand, quartz and monodisperse silica), (2) alumina, (3) silicates containing at least 30% by weight of $SiO_2$ [e.g., amorphous or crystalline clay mineral and aluminosilicate (including a calcined material and hydrate), chrysotile, zircon and fly ash]; (4) oxides of Mg, Zn, Zr and Ti; (5) sulfates of Ca and Ba; (6) phosphates of Li, Na and Ca (including monohydrates and dihydrates); (7) benzoates of Li, Na and K; (8) terephthalates of Ca, Ba, Zn and Mn; (9) titanates of Mg, Ca, Ba, Zn, Cd, Pb, St, Mn, Fc, Co and Ni; (10) chromates of Ba and Pb; (11) carbon (e.g., carbon black and graphite); (12) glass (e.g., powdered glass and glass beads); (13) carbonates of Ca and Mg; (14) fluorite; and (15) ZnS. More preferred are silicon dioxide, silicic acid anhydride, hydrous silicic acid, alumina, aluminum silicate (including calcined material and hydrates), monolithium phosphate, trilithium phosphate, sodium phosphate, calcium phosphate, barium phosphate, titanium oxide, lithium benzoate, double salts of these compounds (including hydrates), powdered glass, clay (including kaolin, bentonite and china clay), talc, diatomaceous earth and calcium carbonate. Particularly preferred are monodisperse silica, titanium oxide, alumina and calcium carbonate.

It is particularly advantageous to use monodisperse silica for the first inert solid particles and calcium carbonate for the second inert solid particles.

In the biaxially oriented, unidirectionally long film of the present invention, the Young's modulus ($E_M$) in the length direction is at least 650 kg/mm$^2$, preferably at least 800 kg/mm$^2$, more preferably at least 900 kg/mm$^2$.

In the biaxially oriented, unidirectionally long film of the present invention, the Young's modulus ($E_T$) in the width direction is at least 600 kg/mm$^2$.

Further, in the biaxially oriented, unidirectionally long film of the present invention, the Young's modulus in the length direction is required to be greater than the Young's modulus in the width direction on the condition that these Young's moduli satisfy the above values. And, the Young's modulus in the length direction is preferably greater than the Young's modulus in the width direction by at least 50 kg/mm$^2$, more preferably by at least 200 kg/mm$^2$, particularly preferably by at least 300 kg/mm$^2$.

In a tape produced from a film of which the Young's moduli do not satisfy the above values and the above relationship, a tape edge sometimes bends or the tape is sometimes elongated while the tape runs. Further, when the Young's moduli are lower than the above lower limits, the contact pressure of the tape to a video rotating head is insufficient, and the electromagnetic characteristics deteriorate.

Further, in the biaxially oriented, unidirectionally long film of the present invention, the heat shrinkage factor in the length direction in heat treatment at 70° C. under no load for 1 hour is required to be not more than 0.08%. The heat shrinkage factor is preferably not more than 0.04%. When the heat shrinkage factor is more than 0.08%, a tape produced from a film having such a heat shrinkage factor causes a thermal irreversible change, and the tape also shows skew distortion when there is difference between a videotape-recording temperature and a videotape-reproducing temperature. When the heat shrinkage factor is too large, the base film has a surface roughness printing effect on a magnetic surface, and the magnetic surface is therefore roughened. The heat shrinkage factor in heat treatment at 70° C. for 1 hour is generally decreased by increasing the temperature for heat treatment of a stretched film. When the temperature for heat treatment is too high, the mechanical properties deteriorate, and the film is greatly scratched in a step of processing it into a magnetic tape. Further, dust produced by scratching adheres to the magnetic surface of the magnetic tape to cause a drop out. To avoid tills problem, it is preferred to subject the film to relaxing treatment in which the film is passed through a nip formed by two rolls having different rotation rates at a temperature equivalent to, or higher, than the glass transition temperature (Tg) of polyethylene-2,6-naphthalate, although the means of decreasing the heat shrinkage factor shall not be limited to this.

The biaxially oriented, unidirectionally long film of the present invention has a surface roughness, Ra, of 3 to 10 nm, preferably 5 to 8. When Ra is larger than 10 nm, it is difficult to maintain the electromagnetic characteristics required of a high-density recording magnetic tape. When Ra is smaller than 3 nm, the friction coefficient increases to make it very difficult to handle the film and take it up in a roll form.

The biaxially oriented, unidirectionally long polyethylene-2,6-naphthalate film of the present invention can be produced, for example, by melt-extruding polyethylene-2,6-naphthalate at a temperature between the melting point (Tm:°C.) of polyethylene-2,6-naphthalate and (Tm+70)°C. to obtain an unstretched film having an intrinsic viscosity of 0.35 to 0.9 dl/g, stretching the unstretched film uniaxially (lengthwise or widthwise) at a temperature between (Tg−10)°C. and (Tg+70)°C. (wherein Tg stands for the glass transition temperature of polyethylene-2,6-naphthalate) at a stretch ratio of 2.5 to 7.0 times and then, stretching the uniaxially stretched film at right angles to the above stretching direction (e.g., widthwise in this second stage stretching if the first stage stretching has been carried out lengthwise) at a temperature between Tg (°C.) and (Tg+70)°C. at a stretch ratio of 2.5 to 7.0 times. In this case, the area stretch ratio is preferably 9 to 35 times, more preferably 12 to 35 times. The stretching method may be any one of a simultaneous biaxial stretching method and a consecutive biaxial stretching method. Further, the biaxially oriented film may be thermoset at a temperature between (Tg+70)°C. and Tm (°C.). For example, it is preferred to thermoset the biaxially oriented film at a temperature between 190° C. and 250° C. The time required for the thermosetting is generally 1 to 60 seconds.

When further improved mechanical properties are desirable, the stretching shall not be limited to the above two-stage stretching. A biaxially oriented, unidirectionally long film having further improved mechanical properties can be obtained by thermosetting the above-obtained biaxially oriented film at a temperature between (TK+20)°C. and (Tg+70)°C., stretching it either lengthwise or widthwise at a temperature higher than the thermosetting temperature by 10° to 40° C., and further stretching it either widthwise or lengthwise at a temperature further higher than this temperature by 20° to 50° C. such that the total stretch ratio in the length direction is 5.0 to 8.0 times and that the total stretch ratio in the width direction is 5.0 to 8.0 times. The stretching method may be any one of a simultaneous biaxial stretching method and a consecutive biaxial stretching method. Further, the numbers of lengthwise and widthwise stretching operation shall not be limited to the above, and the above unstretched film may be stretched lengthwise and widthwise several times each.

In the above methods, the biaxially oriented film may be finally thermoset at a temperature between (Tg+70)°C. and Tm (°C.). For example, it is preferred to thermoset the biaxially oriented film at a temperature between 190° C. and 250° C. The time required for the thermosetting is generally 1 to 60 seconds.

There is no particular limitation on the thickness of the biaxially oriented, unidirectionally long polyethylene-2,6-naphthalate film of the present invention. However, the thickness is generally preferably not more than 36 μm. Further, for a decrease in the base film thickness due to improvement in the strength of a magnetic layer, the above thickness is more preferably not more than 25 μm, further preferably not more than 19 μm. Furthermore, in response to need for machine downsizing and a decrease in the thickness of a long-time-use recording medium, the base film thickness is preferably not more than 15 μm, more preferably not more than 12 μm, particularly preferably in the range of from 2 to 12 μm.

The biaxially oriented, unidirectionally long polyethylene-2,6-naphthalate film of the present invention preferably has a friction coefficient ($\mu k$) of not more than 0.35 at a running time. When this film is used as a base for a magnetic tape, the degree of abrasion of the base film due to contact friction thereof with a running portion of a magnetic record reproducing apparatus (hardware) is very little, the base film shows excellent durability, and high electromagnetic characteristics can be obtained.

When a magnetic recording tape is produced from the biaxially oriented, unidirectionally long polyethylene-2,6-naphthalate film of the present invention, the surface roughness of the magnetic layer is small, and the contact pressure of the tape to the head of a VTR increases. As a result, electromagnetic characteristics required for high-density magnetic recording can be obtained. Further, when the tape is running, malfunctions such as bending of a tape edge and elongation of the tape hardly occur, and the tape shows excellent thermal stability. As a result, little skew distortion occurs. The biaxially oriented, unidirectionally long polyethylene-2,6-naphthalate film of the present invention is useful as a base film for a high-density magnetic recording tape, particularly a metal tape.

According to the present invention, therefore, there is also provided a magnetic recording medium obtained by forming a magnetic layer on one surface or both surfaces of the above biaxially oriented, unidirectionally long polyethylene-2,6-naphthalate film. The magnetic layer and the method for forming the magnetic layer on a base film are known per se, and known magnetic layers and known methods for forming the magnetic layer can be employed in the present invention. For example, when the magnetic layer is formed on a base film by coating a magnetic coating composition on the base film, the ferromagnetic powder for use in the magnetic layer includes known ferromagnetic materials such as $\gamma\text{-}Fe_2O_3$, Co-containing $\gamma\text{-}Fe_3O_4$, Co-coated $Fe_3O_4$, $CrO_2$ and barium ferrite. The binder for use with the magnetic powder includes known thermoplastic resins, thermosetting resins, reactive resins and mixtures of these. These resins include a vinyl chloride-vinyl acetate copolymer and polyurethane elastomer.

The magnetic coating composition may further contain an abrasive (e.g., $\alpha\text{-}Al_2O_3$), an electrically conductive material (e.g., carbon black), a dispersant (e.g., lecithlin), a lubricant (e.g., n-butyl stearate and lecithin), a curing agent (e.g., an epoxy resin), and a solvent (e.g., methyl ethyl ketone, methyl isobutyl ketone and toluene).

EXAMPLES

The present invention will be further explained hereinafter by reference to Examples.

The physical properties and characteristics in the present invention were measured and/or are defined as follows.

(1) Young's modulus

A film was cut to prepare a sample having a width of 10 mm and a length of 150 mm, and the sample was pulled with an Instron type universal tensile tester at a distance of 100 mm between chucks, at a pulling rate of 10 mm/minute and at a charting rate of 500 mm/minute. The Young's modulus was calculated on the basis of a tangent in a rising portion of the resultant load-elongation curve.

(2) Surface roughness (Ra) of film

A chart (film surface roughness curve) was prepared with a needle-contacting type surface roughness tester (Surf coder SE 30C, supplied by Kosaka Laboratories Ltd.) with a needle radius of 2 μm under a needle pressure of 30 mg. A portion having a measured length L in the direction of its center line was picked up from the film surface roughness curve. The center line of this portion picked up was taken as an X axis, the direction of the length multiplication was taken as a Y axis, and the roughness curve was expressed as Y=f(x). The value (Ra: μm) given by the following equation was defined as a film surface roughness.

$$Ra = \frac{1}{L} \int_0^L |f(x)| dx$$

(3) Heat shrinkage factor

A film having a length of about 30 cm and a width of 1 cm, which had been accurately measured for its length in advance, was placed in an oven at 70° C. under no load, and heat-treated for 1 hour. Then, the film was taken out of the oven, and allowed to stand until it had a room temperature, and measured for a length to determine a change in the length. The heat shrinkage factor was determined by the following equation, $$\text{Heat shrinkage factor (\%)} = \frac{\Delta L}{L_0} \times 100$$

in which $L_0$ is the length before the heat treatment and $\Delta L$ is a dimensional change amount.

(4) Skew

A video tape used for recording at an ordinary temperature (20° C.) at an ordinary humidity (60% RH) was heat-treated at 70° C. for 1 hour, and thereafter, the tape was played back at an ordinary temperature at an ordinary humidity. And, a skew deviation was measured at a VTR head switching point.

(5) Electromagnetic characteristics

A magnetic tape for video use was measured for an S/N ratio with a noise meter supplied by ShibaSoku Co., Ltd. Further, a difference between the so-obtained S/N ratio and the S/N ratio of a tape of Comparative Example 3 in Table 3 was determined. A VTR, EV-S700, supplied by Sony Co., Ltd., was used.

(6) Durability of magnetic tape

While a magnetic tape was allowed to run by starting and stopping repeatedly with EV-S700 supplied by Sony Co., Ltd., for 100 hours, the tape was examined on its running state and measured for its output. The running durability of the tape was determined as follows.

<Evaluation based on 3 ratings>

: Tape edge does not bend and tape has no wavy and crinkly form. Further, no abrasion occurs, and no white dust adheres.

Δ: Tape edge bends and tape becomes wavy or crinkled to some extent. Further, adherence of a small amount of white dust is observed.

X: Tape edge shows extraordinary bending and tape has a wavy or crinkled form. Further, the tape is heavily abraded, and a large amount of white dust occurs.

(7) Defect-free product ratio of rolled tapes

A film was taken up in a roll form having a film width of 500 mm and a film length of 4,000 m to prepare 100 rolls. The defect-free product includes the following:

(i) A film is taken up cylindrically, and the film roll has no square deformation and has no film portion sagging.
(ii) A film roll has no wrinkles.

(8) Average particle diameter of inert particles

Inert particles were measured for diameters with a CP-50 centrifugal particle size analyzer supplied by Shimadzu Corporation. On the basis of the resultant centrifugal sedimentation curve, there was prepared a cumulative curve showing particle diameters and amounts of particles having the above particle diameters. In the cumulative curve, a particle diameter corresponding to a 50 mass percent was read, and the value of the read particle diameter was defined as the above average particle diameter.

EXAMPLE 1

Polyethylene-2,6-naphthalate containing 0.2% by weight of monodisperse silica particles having an average particle diameter of 0.1 μm and 0.014% by weight of calcium carbonate particles having an average particle diameter of 0.6 μm and having an intrinsic viscosity of 0.62 dl/g (measured in o-chlorophenol as a solvent at 25° C.) was dried at 170° C., and then melt-extruded at 300° C. And, the extruded product was rapidly cooled and solidified on a casting drum kept at 60° C. to give an unstretched film having a thickness of 180 μm.

The above-obtained unstretched film was stretched lengthwise at a stretch ratio of 2.3 times at 130° C., and then stretched widthwise at a stretch ratio of 4.0 times at 130° C. The so-stretched film was subjected to intermediate heat-treatment at 160° C. Further, the film was stretched lengthwise at a stretch ratio of 2.4 times at 170° C., stretched widthwise at a stretch ratio of 1.5 times at 170° C., and heat-treated at 215° C. to give a biaxially oriented film having a thickness of 7 μm.

Components shown in the following Table 1 were placed in a ball mill, and kneaded and dispersed for 16 hours. 5 Parts by weight of an isocyanate compound (Desmodur L, supplied by Bayer AG) was added, and the resultant mixture was sheared and dispersed at a high velocity for one hour to obtain a magnetic coating composition.

TABLE 1

| Component for magnetic coating composition: | |
| --- | --- |
| Needle-like Fe particles | 100 parts by weight |
| Vinyl-chloride-vinyl acetate copolymer (S-Lec 7A, supplied by Sekisui Chemical Co., Ltd.) | 15 parts by weight |
| Thermoplastic polyurethane resin | 5 parts by weight |
| Chromium oxide | 5 parts by weight |
| Carbon black | 5 parts by weight |
| Lecithin | 2 parts by weight |
| Fatty acid ester | 1 part by weight |
| Toluene | 50 parts by weight |
| Methyl ethyl ketone | 50 parts by weight |
| Cyclohexanone | 50 parts by weight |

The so-prepared magnetic coating composition was applied to one surface of the above-obtained polyethylene-2,6-naphthalate film such that the coating thickness was 3 μm, and the resultant film was subjected to orientation treatment in a direct current magnetic field at 2,500 Gauss. Then, the coating was dried under heat at 100° C. and super-calendered (linear pressure 200 kg/cm, temperature 80° C.), and the resultant tape was taken lip. The so-obtained tape roll was allowed to stand in an oven at 55° C. for 3 days.

Further, a back-coating composition obtained from components shown in the following Table 2 was applied and dried, and the resultant film was cut to a width of 8 mm to give a magnetic tape.

TABLE 2

| Back-coating composition: | |
| --- | --- |
| Carbon black | 100 parts by weight |
| Thermoplastic polyurethane resin | 60 parts by weight |
| Isocyanate compound (Coronate-L, supplied by Nippon Polyurethane Co., Ltd.) | 18 parts by weight |
| Silicone oil | 0.5 part by weight |
| Methyl ethyl ketone | 250 parts by weight |
| Toluene | 50 parts by weight |

Table 3 shows the properties of the above-obtained film and tape. As is clear in Table 3, the defect-free product ratio of rolled tapes was excellent, and the electromagnetic characteristics, running durability and skew were also excellent.

EXAMPLE 2

Example 1 was repeated except the inert solid particles were replaced with 0.35% by weight of monodisperse silica particles having an average particle diameter of 0.1 μm as smaller size particles (first inert solid particles) and 0.01% by weight of calcium carbonate particles having an average particle diameter of 0.8 μm as larger size particles (second inert solid particles), to give an unstretched film. Then, the unstretched film was treated in the same manner as in Example 1 to give a biaxially oriented film having a thickness of 7 μm.

Thereafter, the above-obtained film was treated in the same manner as in Example 1 to obtain a tape. Table 3 shows the properties of the above film and tape. Like Example 1, excellent results were obtained.

EXAMPLE 3

Example 2 was repeated except that the inert solid particles were replaced with 0.3% by weight of monodisperse silica particles having an average particle diameter of 0.25 μm and 0.015% by weight of calcium carbonate particles having an average particle diameter of 0.5 μm, to obtain a film and then a tape. Table 3 shows the properties of the above film and tape. Like Example 2, excellent results were obtained.

EXAMPLE 4

An unstretched film was obtained in the same manner as in Example 1 except that the inert solid particles were replaced with 0.3% by weight of silica particles having an average particle diameter of 0.1 μm as smaller size particles and 0.014% by weight of calcium carbonate particles having all average particle diameter of 0.6 μm as larger size particles. Then, the unstretched film was stretched lengthwise at a stretch ratio of 2.3 times at 130° C., and then stretched widthwise at a stretch ratio of 4.0 times at 130° C. The so-stretched film was subjected to intermediate heat-treatment at 160° C. Further, the film was stretched lengthwise at a stretch ratio of 3.1 times at 170° C., stretched widthwise at a stretch ratio of 1.05 times at 170° C., and heat-treated at 215° C. to give a biaxially oriented film having a thickness of 7 μm.

Thereafter, a tape was obtained in the same manner as in Example 1. Table 3 shows the properties of the above film and tape. Like Example 1, excellent results were obtained.

COMPARATIVE EXAMPLE 1

Example 1 was repeated except that the inert solid particles were replaced with 0.05% by weight of monodisperse silica having an average particle diameter of 0.02 μm, to obtain a biaxially oriented film having a thickness of 7 μm. The tape film could not be taken up due to defective lubricity of the base film, and consequently, no magnetic tape was obtained.

COMPARATIVE EXAMPLE 2

Example 1 was repeated except that the inert solid particles were replaced with 0.3% by weight of monodisperse silica particles having an average particle diameter of 0.15 μm as smaller size particles and 0.03% by weight of calcium carbonate particles having an average particle diameter of 0.2 μm as larger size particles, to obtain a film and then a tape. Table 3 shows the properties of the film and tape. The electromagnetic characteristics of the tape were poor, and the defect-free product ratio of rolled tapes was 50% or inferior to that of Example 1.

COMPARATIVE EXAMPLE 3

Example 1 was repeated except that the stretch ratio in the length direction was changed to 3.7 times and the stretch ratio in the width ratio was changed to 4.0 times (the temperature for stretching in each direction was the same as that in Example 1), to give a film and then a tape. Table 3 shows the properties of the tape and film. The tape showed poor running durability due since it had a low Young's modulus. Further, the tape showed poor electromagnetic characteristics due to its low stiffness.

COMPARATIVE EXAMPLE 4

Example 1 was repeated except that the relaxation treatment was omitted, to give a film and then a tape. Table 3 shows the properties of the film and tape. The tape showed large skew due to its high heat shrinkage factor. Further, the magnetic surface was toughened due to a surface roughness printing effect, and the electromagnetic characteristics was slightly inferior.

COMPARATIVE EXAMPLE 5

Example 1 was repeated except that the inert solid particles were replaced with 0.2% by weight of monodisperse silica particles having an average particle diameter of 0.35 μm as smaller size particles and 0.01% by weight of calcium carbonate particles having an average particle diameter of 1.2 μm as larger size particles, to obtain a film and then a tape. Table 3 shows the properties of the film and tape. Since the base film had a large surface roughness (Ra), time magnetic surface was also roughened, and the electromagnetic characteristics was poor. Further, since the larger size particles had a large diameter and coarse projections were dispersed on the tape surface, the tape abrasion occurred to some extent when time tape was running, and the running durability was rather poor.

COMPARATIVE EXAMPLE 6

An unstretched film was obtained in the same manner as in Example 1 except that the inert solid particles were replaced with 0.35% by weight of monodisperse silica particles having an average particle diameter of 0.1 μm as smaller size particles and 0.01% by weight of calcium carbonate particles having an average particle diameter of 0.8 μm as larger size particles. The unstretched film was stretched lengthwise at a stretch ratio of 2.3 times at 130° C., and then stretched widthwise at a stretch ratio of 4.0 times at 130° C. Then, the so-stretched film was subjected to intermediate heat-treatment at 160° C. Further, the film was stretched lengthwise at a stretch ratio of 2.6 at 170° C., and heat-treated at 215° C. to give a film. The film was treated in the same manner as in Example 1 to give a tape. Table 3 shows the properties of the film and tape. Since the tape showed a low Young's modulus in the width direction, an edge damage occurred, and the running durability was inferior to some extent. Further, since the ratio between the Young's modulus in the length direction and the Young's modulus in the width direction was too large, the affinity of the tape with a VTR head was poor and the electromagnetic characteristics was also poor.

COMPARATIVE EXAMPLE 7

Example 1 was repeated except that the inert solid particles were replaced with 0.5% by weight of monodisperse silica particles having an average particle diameter of 0.1 μm as smaller size particles and 0.07% by weight of calcium carbonate particles having an average particle diameter of 1.2 μm as larger size particles, to obtain a film and then a tape. Table 3 shows the properties of the tape and film. Since the surface roughness (Ra) of the base film was very large and the magnetic surface was also rough, the electromagnetic characteristics was poor and white dust greatly occurred due to abrasion.

TABLE 3

| | Unit | Example 1 | Example 2 | Example 3 | Example 4 | Comp. Example 1 | Comp. Example 2 | Comp. Example 3 |
|---|---|---|---|---|---|---|---|---|
| Particles | | | | | | | | |
| Kind | | Monodisperse silica | Monodisperse silica | Monodisperse silica | Monodisperse silica | Monodisperse silica | Monodisperse silica | Monodisperse silica |
| Particle diameter | μm | 0.1 | 0.1 | 0.25 | 0.1 | 0.02 | 0.15 | 0.1 |
| Amount | wt % | 0.2 | 0.35 | 0.3 | 0.3 | 0.05 | 0.3 | 0.2 |
| Kind | | Calcium carbonate | Calcium carbonate | Calcium carbonate | Calcium carbonate | — | Calcium carbonate | Calcium carbonate |
| Particle diameter | μm | 0.6 | 0.8 | 0.5 | 0.6 | — | 0.2 | 0.6 |
| Amount | wt % | 0.014 | 0.01 | 0.015 | 0.014 | — | 0.03 | 0.014 |
| Properties of base film | | | | | | | | |
| Surface roughness (Ra) | μm | 0.006 | 0.006 | 0.008 | 0.006 | 0.002 | 0.004 | 0.005 |
| Young's modulus | | | | | | | | |
| :EM | kg/mm$^2$ | 800 | 800 | 800 | 1250 | 700 | 700 | 630 |
| :ET | kg/mm$^2$ | 750 | 750 | 750 | 630 | 730 | 730 | 590 |
| Heat shrinkage factor (lengthwise) 70° C. × 1 hr | % | 0.05 | 0.05 | 0.05 | 0.07 | 0.06 | 0.06 | 0.03 |
| Defect-free product ratio | % | 95 | 98 | 98 | 98 | Impossible to wind | 50 | 90 |
| Properties of tape | | | | | | | | |
| Electromagnetic characteristic Y-S/N | dB | +3.4 | +2.0 | +1.5 | +3.0 | — | +3.5 | 0 |
| Running durability | — | ◯ | ◯ | ◯ | ◯ | — | ◯ | ◯ |
| Skew | μsec | 3 | 2 | 2 | 4 | — | 3 | 3 |

| | Unit | Comp. Example 4 | Comp. Example 5 | Comp. Example 6 | Comp. Example 7 |
|---|---|---|---|---|---|
| Particles | | | | | |
| Kind | | Monodisperse silica | Monodisperse silica | Monodisperse silica | Monodisperse silica |
| Particle diameter | μm | 0.1 | 0.35 | 0.1 | 0.1 |
| Amount | wt % | 0.2 | 0.2 | 0.3 | 0.5 |
| Kind | | Calcium carbonate | Calcium carbonate | Calcium carbonate | Calcium carbonate |
| Particle diameter | μm | 0.6 | 1.2 | 0.6 | 1.2 |
| Amount | wt % | 0.014 | 0.01 | 0.014 | 0.07 |
| Properties of base film | | | | | |
| Surface roughness (Ra) | μm | 0.005 | 0.010 | 0.006 | 0.012 |
| Young's modulus | | | | | |
| :EM | kg/mm$^2$ | 700 | 800 | 1150 | 800 |
| :ET | kg/mm$^2$ | 730 | 750 | 550 | 750 |
| Heat shrinkage factor (lengthwise) 70° C. × 1 hr | % | 0.12 | 0.05 | 0.07 | 0.06 |
| Defect-free product ratio | % | 95 | 96 | 90 | 95 |
| Properties of tape | | | | | |
| Electro- | dB | +1.0 | 0 | 0 | −1.0 |

TABLE 3-continued

| | | | | | |
|---|---|---|---|---|---|
| magnetic characteristic Y-S/N | | — | ○ | △ | △ | X |
| Running durability | | | | | | |
| Skew | μsec | | 10 | 2 | 4 | 4 |

What is claimed is:

1. A biaxially oriented, unidirectionally long polyethylene-2,6-naphthalate film,
    (A) which contains
        (a) 0.05 to 0.4% by weight of first inert solid particles having an average particle diameter of 0.05 to 0.3 μm, and
        (b) 0.005 to 0.05% by weight of second inert solid particles having an average particle diameter of 0.3 to 1.0 μm, this average particle diameter being greater than the average particle diameter of the first inert solid particles by at least 0.25 μm, wherein:
    (B) the Young's modulus in the length direction is at least 650 kg/mm² the Young's modulus in the width direction is at least 600 kg/mm² the Young's modulus in the length direction is greater than the Young's modulus in the width direction,
    (C) the heat shrinkage factor in the length direction in heat treatment at 70° C. for 1 hour under no load is not more than 0.08%, and
    (D) the surface roughness, Ra, is 3 to 10 nm.

2. A unidirectionally long film according to claim 1, wherein the first inert solid particles are of monodisperse silica.

3. A unidirectionally long film according to claim 1, wherein the second inert solid particles are of calcium carbonate.

4. A unidirectionally long film according to claim 1, which has a thickness of 2 to 12 μm.

5. A magnetic tape obtained by forming a magnetic recording layer on one surface of the biaxially oriented, unidirectionally long polyethylene-2,6-naphthalate film recited in claim 1.

* * * * *